United States Patent [19]

Jackson

[11] Patent Number: 4,511,116
[45] Date of Patent: Apr. 16, 1985

[54] VARIABLE OPENING PINCH SLEEVE VALVE

[75] Inventor: Lawrence D. A. Jackson, Quebec, Canada

[73] Assignee: Linatex Canada Inc., Montreal, Canada

[21] Appl. No.: 131,195

[22] Filed: Mar. 17, 1980

[51] Int. Cl.³ .................... F16L 55/14; F16K 31/126
[52] U.S. Cl. ........................................ 251/5; 251/28; 137/85
[58] Field of Search ............... 251/5, 28; 91/387; 137/85

[56] References Cited

U.S. PATENT DOCUMENTS

| | | | |
|---|---|---|---|
| 2,993,498 | 7/1961 | Brand | 91/387 |
| 3,485,472 | 12/1969 | Bozich | 251/5 |
| 4,143,850 | 3/1979 | Brakebill | 251/28 |

OTHER PUBLICATIONS

Publication Re Conoflow, Model J Positioner, Published 4/1/66 by Conoflow, pp. 1-2, 5-8.
Publication Re Conoflow, Commandaire Model 31 Positioner, Published 10/1973, pp. 1-4.
Publication Re Moore Built-In Positioners, Published 6/1966, pp. 1-2.

*Primary Examiner*—Martin P. Schwadron
*Attorney, Agent, or Firm*—Larson and Taylor

[57] ABSTRACT

A pinch sleeve valve having controllable opening positions regardless of internal sleeve pressure is disclosed. In the past it has not been possible to use a pinch sleeve valve as a control valve because a variation in pressure within the sleeve has affected the opening of the sleeve. The present valve comprises a flexible sleeve with a passageway therethrough, the sleeve having variable positions from a round cross section when fully open, to a collapsed cross section when closed. A rigid pressure sealed housing contains the sleeve and a sensing probe is connected to the sleeve which senses whether the sleeve is fully open, partially open or closed. A valve positioner is connected to the sensing probe and has a control system to set opening positions of the valve regardless of variations in the internal sleeve pressure, the valve positioner controls supply fluid to the housing at a pressure higher than the internal sleeve pressure and sufficiently high to close the sleeve to the desired opening position.

4 Claims, 5 Drawing Figures

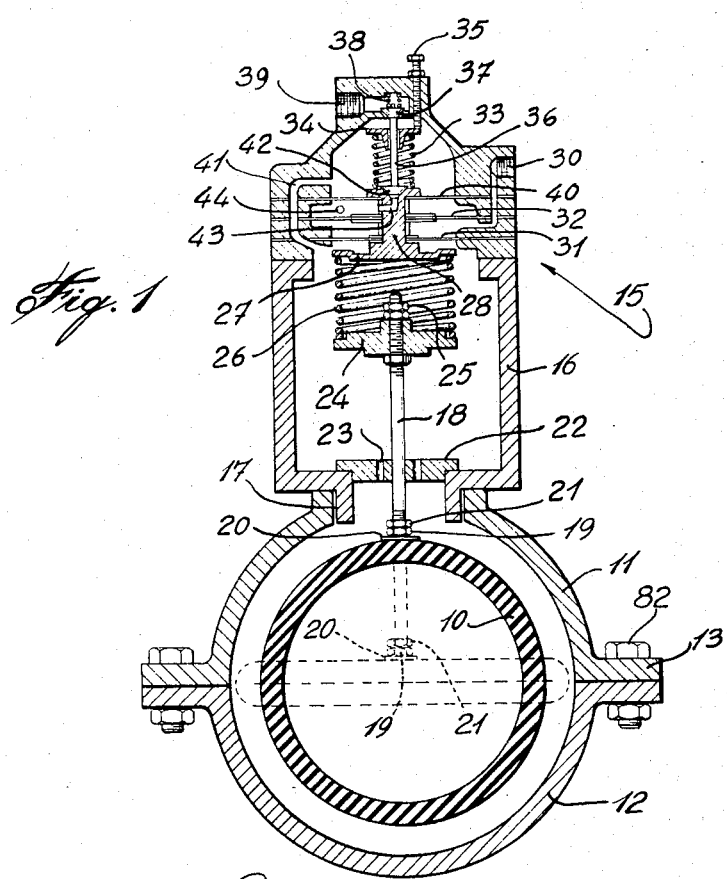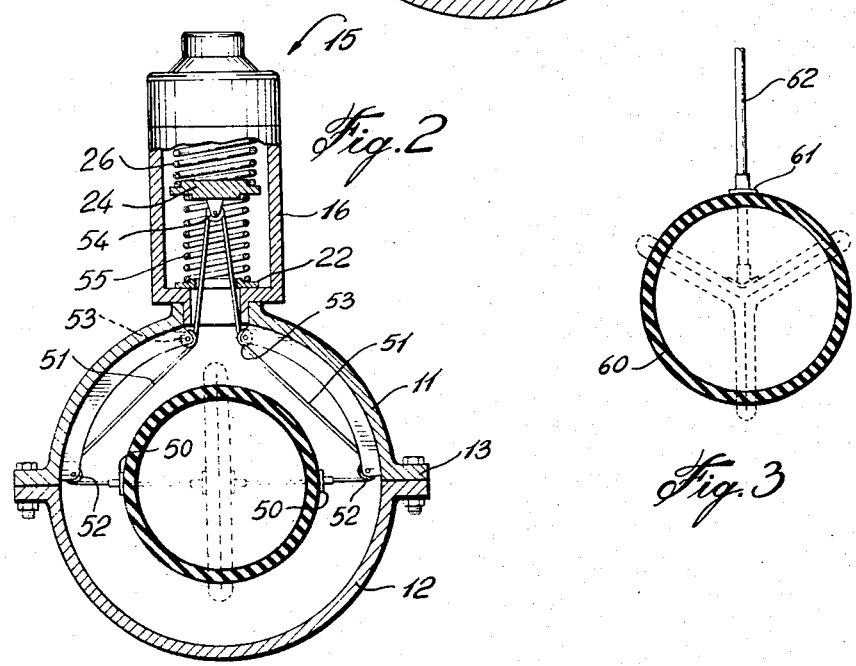

VARIABLE OPENING PINCH SLEEVE VALVE

The present invention relates to a variable opening pinch sleeve valve. More specifically the invention provides a pinch sleeve valve having a control that allows controllable openings in the valve regardless of the line pressure or internal sleeve pressure within the valve.

Pinch sleeve valves are well known, they are used in flow lines handling abrasive materials in suspension such as sand, minerals, etc., and have sleeves made of rubber or other resilient material. The flexible sleeve is contained within a rigid pressure sealed housing, and a fluid such as air is supplied to the housing surrounding the sleeve at a pressure higher than the line pressure in the sleeve. This fluid pressure causes the sleeve to collapse and seal thus preventing flow through the valve. This type of sleeve does not erode as do the more common gate, ball or other types of valve because the abrasion resistant rubber lined sleeve extends completely through the valve. However, sleeve valves of this type have not in the past been suitable for control valves because it was not possible to obtain a feed back as to the exact opening in the sleeve, simply because the line pressure within the sleeve itself may vary resulting in variations in the sleeve opening for a given supply air pressure. Thus, one cannot conveniently measure the exact opening in the sleeve relative to that called for by an instrument air signal.

The present invention provides a pinch sleeve valve having controllable opening positions regardless of internal sleeve pressure, comprising a flexible sleeve having a passage way therethrough, the sleeve having variable positions from a round cross section when fully open to a collapsed cross section when closed. A rigid pressure sealed housing contains the sleeve and a sensing means is connected to the flexible sleeve, adapted to sense whether the sleeve is fully open, partially open or closed. A valve positioner is provided connected to the sensing means having a control means to set opening positions of the valve regardless of variations in the internal sleeve pressure, the valve positioner adapted to control supply fluid to the housing at a pressure higher than the internal sleeve pressure and sufficiently high to close the sleeve to the desired opening position.

In a preferred embodiment, the control means comprises compressed air having a pressure range representing fully open to closed. The fluid from the fluid supply is preferably compressed air. The sensing means comprises either a rigid sensing arm, or a sensing cable attached on opposite sides of the sleeve with a pulley system for the cable and a balance spring to hold the cable taut.

In drawings which illustrate the embodiments of the invention:

FIG. 1 is a sectional view through the line of flow of one embodiment of a pinch sleeve valve according to the present invention having control means to set variable opening positions of the valve.

FIG. 2 is a sectional view through the line of flow of another embodiment of a pinch sleeve valve showing a different type of control means.

FIG. 3 is a schematic sectional view of a flexible sleeve for a pinch sleeve valve which collapses into a trilobal configuration.

Figure 4:
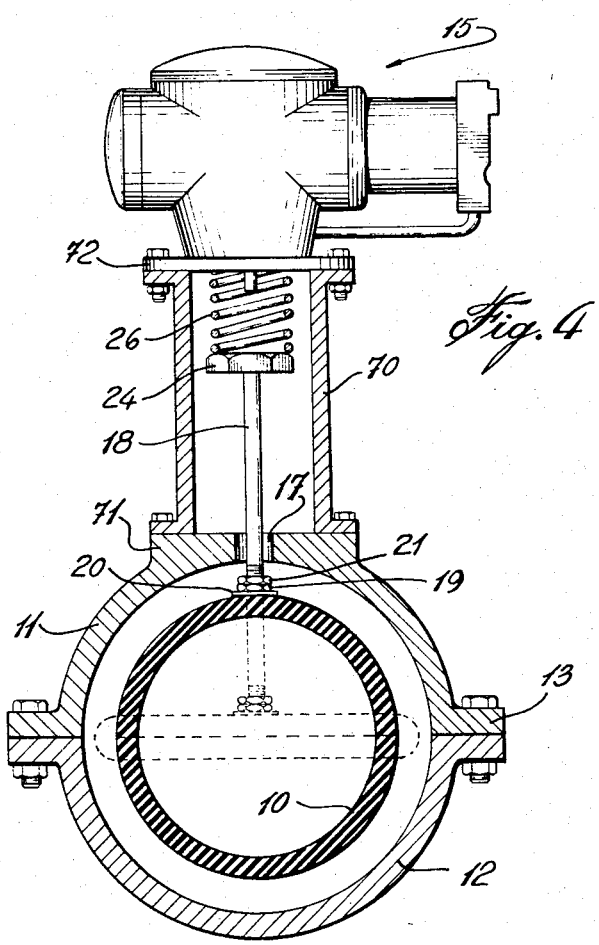
FIG. 4 is a sectional view through the line of flow of another embodiment of a pinch sleeve valve having a different type of valve positioner thereon.

Referring now to the drawings, FIG. 1 shows a variable opening pinch sleeve valve wherein a valve sleeve 10 is made of flexible resilient material and varies from open position as shown in full lines, to a closed or collapsed position as shown in chain-dotted lines. Pinch sleeves are generally constructed of multiple layers of fabric coated with a flexible resin and lined with tough abrasion and corrosion resistant natural rubber, neoprene, nitrile or other material to suit the particular service. The pinch sleeve 10 is enclosed within a rigid housing having an upper body 11 and lower body 12 which may be made from a ductile castiron. Side flanges 13 join the upper body 11 and lower body 12 together.

A valve positioner 15 is mounted on the upper body 11 having a positioner housing 16 screwed into a tapped hole 17 in the upper body 11. A sensing arm 18 is attached to the pinch sleeve 10 by means of a nut 19 attached to a flexible pad 20 on the pinch sleeve 10. A lock nut 21 holds the sensing arm 18 to the nut 19. The sensing arm 18 extends through a guide 22 having apertures 23 therein to permit operating fluid to pass from the housing 16 into the valve body. The top of the sensing arm 18 is attached to a spring support plate 24 by means of two lock nuts 25. A range spring 26 extends between the spring support plate 24 and a top spring support plate 27, which forms part of the diaphragm assembly 28 of the valve positioner 15.

Many types of valve positioners are on the market today, that illustrated in FIG. 1 is of the type sold and constructed by Moore Products Company, and is illustrated schematically. The type shown in FIG. 1 is a known as a top loading direct acting type of positioner. Compressed air is the operating fluid which is supplied to the valve body through the valve positioner housing 16 and an instrument air signal is provided to control the opening of the pinch sleeve 10. If there is a change of line pressure within the pinch sleeve the opening either increases or decreases, this change in opening is monitored by the sensing arm 18 and hence the valve positioner 15 which in turn adjusts the compressed air either exhausting air or increasing air, so that the pinch sleeve expands or contracts to its predetermined opening as selected by the pressure of the instrument air signal.

In operation, the valve positioner shown in FIG. 1 has an instrument air signal pressure inlet 30 where instrument air at a predetermined pressure is fed between a lower diaphragm 31 and a middle diaphragm 32. The middle diaphragm 32 has a larger surface area than the lower diaphragm 31, thus the pressure of the instrument air forces the diaphragm assembly 28 upwards. The diaphragm assembly 28 compresses a suppression spring 33 against spring collar 34 which is located by adjustment screw 35. As the diaphragm assembly 28 moves upwards, a needle 36 opens the inlet valve 37 against inlet valve spring 38 so that supply air enters through a supply air inlet 39. The supply air then passes into the area above top diaphragm 40, passes through passage 41 into the positioner housing 16 and through the orifices 23 in the guide 22 so that air compresses the pinch sleeve 10 closing the pinch sleeve. As the pinch sleeve 10 closes, the sensing arm 18 moves downwards as does the spring support plate 24. This relieves pressure on the diaphragm assembly 28 from the range spring 26 and the diaphragm assembly 28 moves downwards thus causing the inlet valve 37 to close by pressure by the inlet valve spring 38. As the diaphragm assembly 28 moves further downwards, the exhaust valve 42 opens and air from within the valve housing passes upwards through the orifices 23 in the guide 22, through the passage 41, through the exhaust valve 42 and exhaust passage 43 and into the space between the top diaphragm 40 and the middle diaphragm 32. An atmospheric vent 44 allows air in this space to vent. In this manner, the diaphragm assembly 28 reaches equilibrium so that the instrument air pressure acting on the middle diaphragm 32 controls the position of the sensing arm and both the inlet valve 37 and exhaust valve 42 are closed.

If there is a variation in the line pressure within the pinch sleeve 10, then the sleeve opening either increases or decreases. The sensing arm 18 moves and this causes either the inlet valve 37 or the exhaust valve 42 to open thus bringing about an equilibrium state again when the sensing arm 18 is in the position indicating a particular opening of the sleeve 10 as selected from the instrument air signal pressure. The adjustment screw 35 allows minor adjustments to be made, as desired in the field. In one embodiment the instrument air signal pressure varies from 3–15 lbs pressure, a 3 lb pressure indicates the valve is fully open, a 15 lb pressure indicates the valve is closed. There is a linear relationship between instrument air pressure and valve opening through this pressure range. Pinch sleeve valves may vary in size from 1 to 18 inches or larger. In one embodiment of a line of such valves, the maximum line pressure is 100 lbs per square inch. The supply air pressure is preferably in the range of from 30 to 50 lbs per square inch greater than the maximum line pressure to ensure that the pinch sleeve always closes.

Another embodiment of a variable opening pinch sleeve valve is illustrated in FIG. 2 wherein the pinch sleeve 10 collapses in a different plane to that shown in FIG. 1, so that the flattened sleeve 10 is in a vertical rather than a horizontal plane. To monitor the opening of the pinch sleeve 10, two pads 50 are attached to each side of the pinch sleeve 10. A cable 51 is attached to the pads 50 and passes around first pulleys 52 adjacent to the split between the upper body 11 and the lower body 12, and second pulleys 53 adjacent the upper tapped hole 18 in the upper body 11. The cable passes around the first and second pulleys 52, 53 and up to a top pulley 54 attached to the base of the spring support plate 24. A balance spring 55 between the guide 22 and the spring support plate 24 assures tension in the cable 51 and counters the range spring 26, but does not force the pinch sleeve 10 open as the balance spring 55 exerts less force than the pressure applied from the supply air within the housing.

FIG. 3 illustrates another embodiment of a pinch sleeve 60, having a pad 61 and a sensing arm 62 attached thereto. When the sleeve collapses it is designed to form a trilobal shape rather than a flat shape as shown in FIGS. 1 and 2.

Figure 5:
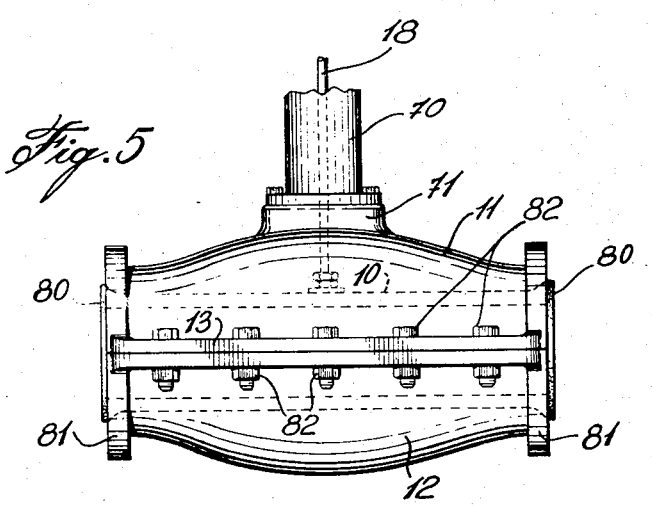
FIG. 5 is a side elevational view of the variable opening sleeve valve shown in FIG. 4.

In FIGS. 4 and 5 a variable opening sleeve valve is shown similar to that shown in FIG. 1, but having a different valve positioner 15 mounted on a cylindrical collar 70, between a top flange 71 of the upper body 11 and the lower flange 72 of the valve positioner 15. The valve positioner may be of the type known under the trade mark Conoflow Model J made by Conoflow Corporation. The range spring 26 allows for movement of the sensing arm 18 of up to 13½" which could cope with a valve size up to 27" in diameter. The operation of the valve positioner is somewhat different to that illustrated in FIG. 1, however, the principle is substantially the same in that a particular instrument air pressure acts on an instrument diaphragm to open either an inlet valve or an exhaust valve permitting supply air or other fluid into or out of the housing, thus either increasing or decreasing the pressure on the pinch sleeve 10 and allowing it to open or close. Movement of the sensing arm 18 due to a variation in line pressure within the pinch sleeve results in a balancing action either opening the exhaust valve or the inlet valve so that the pinch sleeve returns to its predetermined opening, that is the position determined by the particular pressure of the instrument air pressure. FIG. 5 illustrates the pinch sleeve 10 having sleeve flanges 80 at each end which are contained by the valve housing flanges 81. Thus supply air pressure on the sleeve does not move the sleeve flanges 80 which are held between the housing flange and mating pipe flange (not shown). Bolts 82 hold the side flanges 13 of the upper body 11 and lower body 12 together.

Various changes may be made to the present invention without departing from its scope. The range springs may be replaced by a stretchable material such as a rubber diaphragm. The fluid within the housing has been described as compressed air, however, this could be a liquid or other fluid media. Similarly, whereas the control of valve opening has been described as being accomplished by compressed instrument air, it is appreciated that a hydraulic pressure system could also be used for controlling the valve opening. Furthermore, the valve opening may be controlled manually or automatically within methods and systems known in the field of valve positioners.

The embodiments of the invention in which an exclusive property or privilege is claimed are defined as follows:

1. A pinch sleeve valve controllable opening positions regardless of internal sleeve pressure, comprising
    a flexible sleeve having a passageway therethrough, the sleeve having variable positions from a round cross section when fully open, to a collapsed cross section when closed,
    a rigid pressure sealed housing containing the sleeve,
    sensing means connected to the flexible sleeve adapted to sense whether the sleeve is fully open, partially open or closed,
    a valve positioner connected to the sensing means to supply fluid to the housing at a pressure sufficiently higher than the internal sleeve pressure to close the sleeve to the desired opening position, said valve positioner including a control means to adjust the pressure of the fluid supplied to the housing to maintain the desired opening position of the sleeve regardless of variations in the internal sleeve pressure.

2. The sleeve valve according to claim 1 wherein the fluid from the fluid supply is compressed air.

3. The sleeve valve according to claim 1 wherein the sensing means comprises a rigid sensing arm.

4. The sleeve valve according to claim 1 wherein the sensing means comprises a sensing cable attached on opposite sides of the sleeve, a pulley system for the cable and a balance spring to hold the cable taut.

* * * * *